(12) United States Patent
Partlow et al.

(10) Patent No.: US 11,048,618 B2
(45) Date of Patent: Jun. 29, 2021

(54) ENVIRONMENT MODIFICATION FOR SOFTWARE APPLICATION TESTING

(71) Applicant: International Business Machines Corporation, Armonk, NY (US)

(72) Inventors: Steven Partlow, Beacon, NY (US); Joseph Griesemer, Poughkeepsie, NY (US); Robert Miller, Jr., Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 201 days.

(21) Appl. No.: 16/298,064

(22) Filed: Mar. 11, 2019

(65) Prior Publication Data

US 2020/0293430 A1    Sep. 17, 2020

(51) Int. Cl.
*G06F 11/36* (2006.01)

(52) U.S. Cl.
CPC ...... *G06F 11/3664* (2013.01); *G06F 11/3692* (2013.01)

(58) Field of Classification Search
CPC .................. G06F 11/3664; G06F 11/3692
USPC ................................. 717/124–140
See application file for complete search history.

(56) References Cited

U.S. PATENT DOCUMENTS

| | | | | |
|---|---|---|---|---|
| 5,724,273 A * | 3/1998 | Desgrousilliers | ... | G06F 11/2257 702/120 |
| 6,002,871 A * | 12/1999 | Duggan | ............. | G06F 11/3664 714/38.12 |
| 6,031,990 A * | 2/2000 | Sivakumar | .......... | G06F 11/3664 714/E11.208 |
| 6,725,399 B1 * | 4/2004 | Bowman | ............. | G06F 11/3664 714/38.14 |
| 6,907,547 B2 * | 6/2005 | Shaw | .................... | G06F 11/261 714/38.11 |

(Continued)

OTHER PUBLICATIONS

Zhang et al, "Davis: A Generic Interface for iRODS and SRB", IEEE, pp. 74-80 (Year: 2009).*

(Continued)

*Primary Examiner* — Anil Khatri
(74) *Attorney, Agent, or Firm* — Cantor Colburn LLP; Teddi Maranzano

(57) ABSTRACT

Examples of techniques for environment modification for software application testing are described herein. An aspect includes, based on starting testing of an application under test using a test case in a testing environment and determining that modification of the testing environment is enabled, modifying the testing environment. Another aspect includes running the testing of the application under test using the test case in the modified testing environment. Another aspect includes, based on detection of an error during the testing of the application under test, determining whether the error was caused by the modified testing environment. Another aspect includes, based on determining that the error was caused by the modified testing environment, suppressing the error and continuing the testing of the application under test in the modified testing environment. Another aspect includes, based on determining that the error was not caused by the modified testing environment, percolating the error.

17 Claims, 4 Drawing Sheets

(56) References Cited

U.S. PATENT DOCUMENTS

| | | | |
|---|---|---|---|
| 6,980,819 B2 * | 12/2005 | Sugaya | H04B 1/69 370/336 |
| 6,983,216 B2 | 1/2006 | Lam et al. | |
| 7,299,382 B2 * | 11/2007 | Jorapur | G06F 11/3684 703/22 |
| 7,490,319 B2 * | 2/2009 | Blackwell | G06F 11/3664 717/124 |
| 7,607,045 B2 * | 10/2009 | Mills | G06F 11/261 703/21 |
| 7,673,288 B1 * | 3/2010 | Stroomer | G06F 11/3692 717/124 |
| 7,707,572 B2 | 4/2010 | Woollen | |
| 8,087,002 B2 * | 12/2011 | Fjeldstad | G06F 11/3664 717/124 |
| 8,185,877 B1 * | 5/2012 | Colcord | G06F 11/3692 717/127 |
| 8,429,612 B2 * | 4/2013 | Milov | G06F 11/3692 717/124 |
| 8,707,263 B2 * | 4/2014 | Osenkov | G06F 11/3664 717/124 |
| 8,707,265 B2 * | 4/2014 | Li | G06F 11/3672 717/124 |
| 8,924,934 B2 * | 12/2014 | Sullivan | G06F 11/3664 717/124 |
| 9,152,542 B2 * | 10/2015 | Navalur | G06F 11/3684 |
| 9,542,301 B1 * | 1/2017 | Griesemer | G06F 11/3688 |
| 10,534,701 B1 * | 1/2020 | Pande | G06F 11/3688 |
| 10,747,651 B1 * | 8/2020 | Vanderwall | G06F 11/3692 |
| 2006/0179350 A1 | 8/2006 | Nathan et al. | |

OTHER PUBLICATIONS

Wang et al, "Automatic Generation of System Test Cases from Use Case Specifications", ACM, pp. 385-396 (Year: 2015).*

Noor et al, "Studying Test Case Failure Prediction for Test Case Prioritization", ACM, pp. 1-10 (Year: 2017).*

Hiller, "Executable Assertions for Detecting Data Errors in Embedded Control Systems", IEEE, pp. 1-10 (Year: 2000).*

White et al, "A Domain Strategy for Computer Program Testing", IEEE, pp. 247-257 (Year: 1980).*

Liu, "Security Testing of Web Applications: A Search-Based Approach for Detecting SQL Injection Vulnerabilities", ACM, pp. 417-418 (Year: 2019).*

Chen et al, "An Approach to Detecting Domain Errors Using Formal Specification Based Testing", IEEE, pp. 1-8 (Year: 2004).*

Nicolescu et al, "Detecting soft errors by a purely software approach: method, tools and experimental results", IEEE, pp. 1-6 (Year: 2003).*

"System and Method for Programming Modification of Existing Testcases to Test New Software Features," IP.com No. IPCOM000218905D, Jun. 8, 2012, 7 pages.

IBM "List of IBM Patents or Patent Applications Treated as Related; (Appendix P)", Filed Mar. 11, 2019, 2 pages.

Partlow et al., "Function Modification for Software Application Testing," U.S. Appl. No. 16/298,065, filed Mar. 11, 2019.

* cited by examiner

ENVIRONMENT MODIFICATION FOR SOFTWARE APPLICATION TESTING

BACKGROUND

The present techniques relate to computer systems. More specifically, the techniques relate to environment modification for software application testing in computer systems.

The process of software development requires numerous phases. One of these phases is testing. A software product may be tested before it is released to identify and address potential errors in the product. For example, a test case may be computer code which verifies a specific path which the software product in development should follow during execution. Testing a software product prior to release may prevent a developer from having to spend significant time and resources to address errors after a software product has been deployed to many customers.

Most computer applications (hereinafter "applications") are complex systems that, due to their complexity, require significant testing to ensure that the application will execute as desired. To facilitate the testing of applications, test cases or test suites (e.g., a collection of test cases) are designed, implemented and used to test a portion or the whole of an application (often referred to as the application under test). The results of these test cases are then analyzed and evaluated. As many applications can be quite complex, a relatively large number of test cases may be required for the testing of a single application.

For example, a test case for a database application may include testing to determine whether data can be added to the database. The testing of the database application using the test case may include various steps to test this aspect of the application, such as: gaining access to update the database, transmitting the update request; receiving confirmation that the update request has been executed; reading from the database to determine if the data in the update request was stored successfully; and then logging off from the database. The testing may generate an output which indicates whether the application successfully or unsuccessfully performed the test case.

SUMMARY

According to one or more embodiments of the present invention, a system includes a processor configured to, based on starting testing of an application under test using a test case in a testing environment, determine whether modification of the testing environment is enabled. The processor may be further configured to, based on determining that modification of the testing environment is enabled, modify the testing environment. The processor may be further configured to run the testing of the application under test using the test case in the modified testing environment.

According to one or more embodiments of the present invention, a computer-implemented method may include, based on starting testing of an application under test using a test case in a testing environment, determining, by a processor, whether modification of the testing environment is enabled. The method may further include, based on determining that modification of the testing environment is enabled, modifying, by the processor, the testing environment. The method may further include running, by the processor, the testing of the application under test using the test case in the modified testing environment.

According to one or more embodiments of the present invention, a computer program product includes a computer readable storage medium having program instructions embodied therewith, the program instructions executable by a processing device to cause the processing device to perform a method that includes, based on starting testing of an application under test using a test case in a testing environment, determining whether modification of the testing environment is enabled. The method may further include, based on determining that modification of the testing environment is enabled, modifying the testing environment. They method may further include running the testing of the application under test using the test case in the modified testing environment.

DETAILED DESCRIPTION

Embodiments of environment modification for software application testing are provided, with exemplary embodiments being discussed below in detail. Software may be tested by adding new test cases to exercise the software code. When software code is introduced into an application, many test cases may be needed to drive the application, in many different environments and in combination with existing services, in order to test the application. Generating new test cases may be time-consuming, and may miss edge cases for rare situations. Modification of the environment in which existing test cases performing testing of the application may implicitly test new software using existing test cases. Performing testing of an application using an existing test case in a modified environment may allow more thorough testing of the application without having to generate additional test cases. Any existing test cases that drive the application may be used in conjunction with environment modification to test an increased range of application behavior.

In some embodiments, the environment modification may include testing in a subspace mode, in which only a subset of virtual address space is available to the application under test during the testing. In some embodiments, the environment modification may include implementing a cross-memory environment, in which the application under test starts in one address space and is switched to another during the testing. In some embodiments, the environment modification may include running the application under test in a service request block (SRB) mode or task mode.

In some embodiments, environment modification may be enabled by a global switch in the testing environment. The global switch may specify whether environment modification is enabled, and may further specify the type of environment modification that is enabled. Error suppression may allow the test case to continue if errors occur due to the modified environment being incompatible with the test case. Dumps or other unexpected results may be monitored. Further checks may be performed to verify that memory structures are in an acceptable state after performing the testing in the modified environment.

Figure 1:
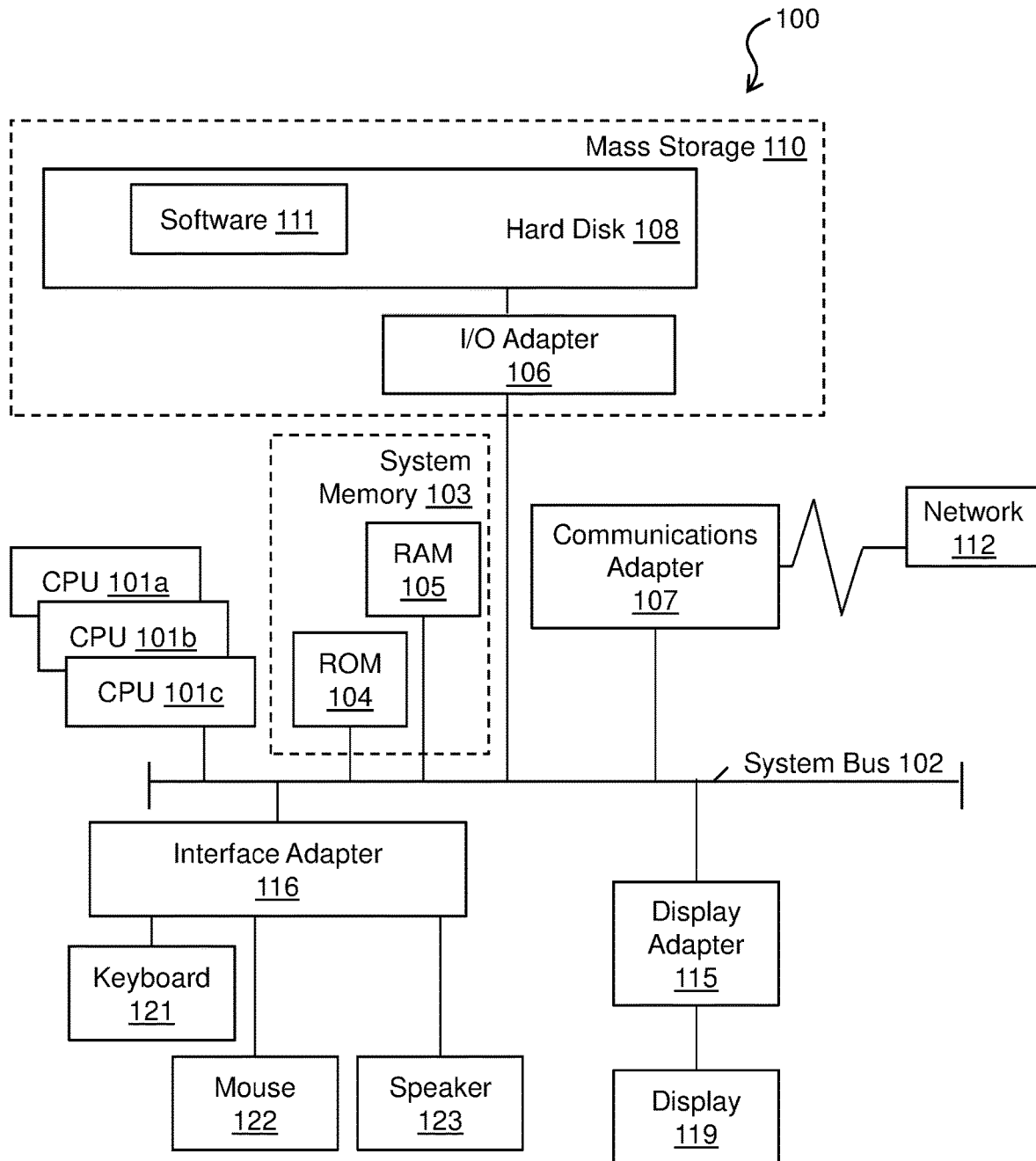
FIG. 1 is a block diagram of an example computer system for environment modification for software application testing.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc. (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computing system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
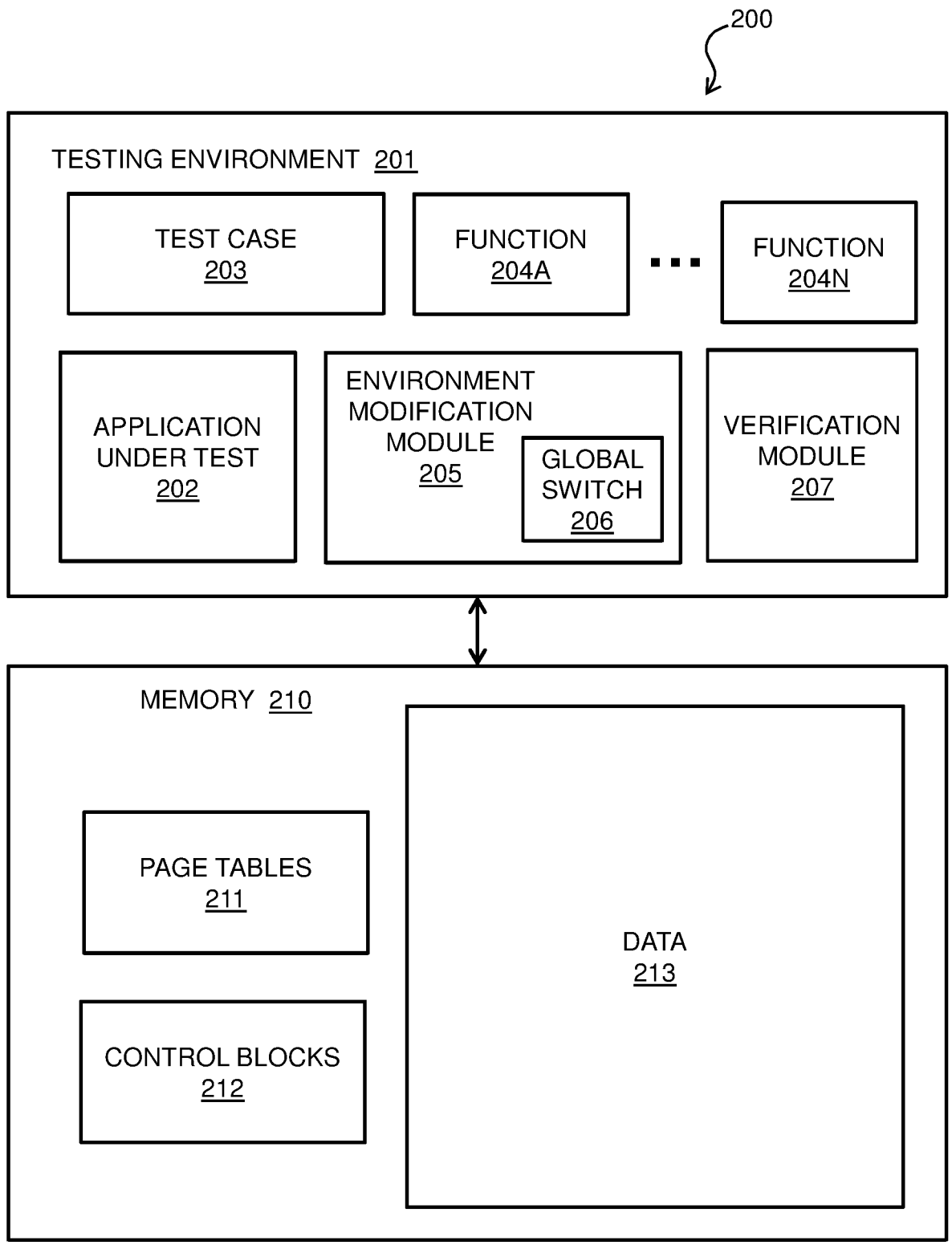
FIG. 2 is a block diagram of an example system for environment modification for software application testing.

FIG. 2 is a block diagram of an example system 200 for environment modification for software application testing. System 200 may be implemented with any suitable computing device, such as the computer system 100 of FIG. 1. System 200 includes testing environment 201 that is in communication with a memory 210. The testing environment 201 includes a test case 203 (which may be one of a plurality of test cases, or part of a test suite comprising a plurality of test cases, in the testing environment 201) that is used to test an application under test 202. During the testing of the application under test 202 using the test case 203, the application under test 202 may call one or more of functions 204A-N. In some embodiments, functions 204A-N may be part of an API. Functions 204A-N may include any appropriate functions, including but not limited to memory operations such as reading or writing of memory, fixing memory, and obtaining locks. The testing environment 201 further includes an environment modification module 205. The environment modification module 205 may include a global switch 206 that may be set by, for example, an administrator of the testing environment 201. The global switch 206 in environment modification module 205 may enable modification of the testing environment 201 during testing of the application under test 202 using the test case 203. The global switch 206 may also specify the type of environment modification that is enabled (e.g., performing the testing in subspace mode, a cross-memory environment, an SRB mode, or task mode). The environment modification module 205 may also handle errors that are encountered during the testing of the application under test 202 using the test case 203. If an error occurs during the testing in the modified environment that is caused by the modified environment, the environment modification module 205 may suppress the error so that the testing may continue. Memory 210 may be accessed during testing of the application under test 202 by the test case 203. Memory 210 includes page tables 211, control blocks 212, and data 213. In some embodiments, the memory 210 may be accessed by application under test 202 using any of functions 204A-N. Verification module 207 may examine page tables 211, control blocks 212, and/or data 213 in memory 210 to determine if any errors occurred during the during testing of the application under test 202 using the test case 203 in the modified testing environment 201. Dumps or other unexpected results may be monitored by the verification module 207. Further checks may be performed by verification module 207 to verify that memory structures in memory 210 are in an acceptable state after testing of the application under test 202 in the modified testing environment 201 by test case 203.

It is to be understood that the block diagram of FIG. 2 is not intended to indicate that the system 200 is to include all of the components shown in FIG. 2. Rather, the system 200 can include any appropriate fewer or additional components not illustrated in FIG. 2 (e.g., additional memory components, embedded controllers, modules, additional network interfaces, applications, test cases, functions, test suites, memory control structures, APIs, etc.). Further, the embodiments described herein with respect to system 200 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 3:
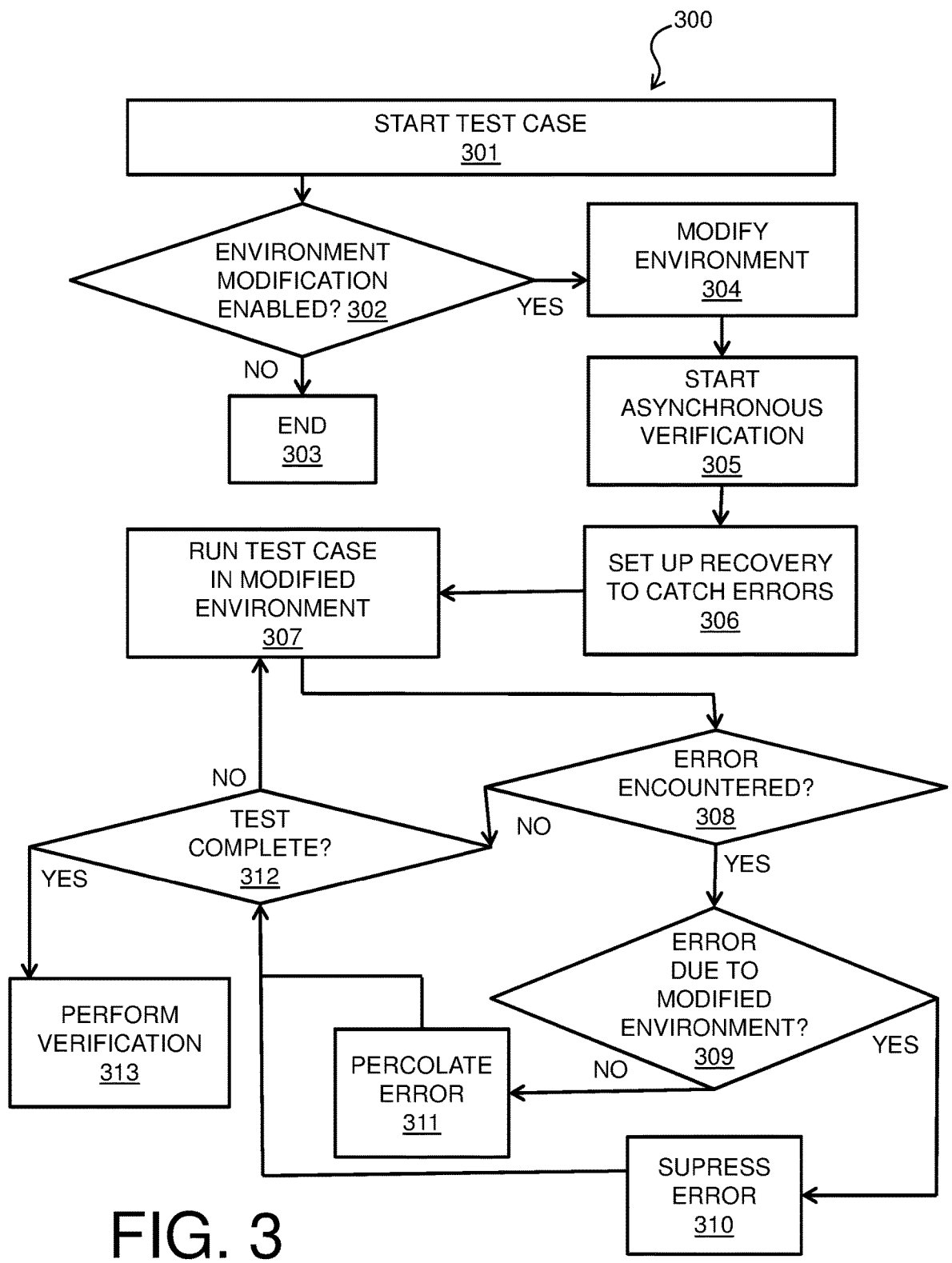
FIG. 3 is a process flow diagram of an example method for environment modification for software application testing.

FIG. 3 is a process flow diagram of an example method 300 for environment modification for software application testing. The method 300 can be implemented with any suitable computing device, such as the computer system 100 of FIG. 1, and may be implemented in system 200 of FIG. 2. In block 301, testing of an application under test 202 is started using a test case 203 in a testing environment 201. The test case 203 may be one of a plurality of test cases in the testing environment 201. In block 302, it is determined whether environment modification is enabled. Whether environment modification is enabled may be determined in block 302 based on a global switch 206 located in an environment modification module 205 in testing environment 201. The global switch 206 may be set by, for example, an administrator of the testing environment 201. This global switch 206 may specify the type of modification to be made to the testing environment 201 during the testing of application under test 202 by test case 203 (e.g., subspace mode, a cross-memory environment, SRB mode, or task mode). The global switch may apply to an entire test suite, which may include a plurality of test cases such as test case 203.

If it is determined in block 302 that environment modification is not enabled, based on the global switch 206, flow proceeds from block 302 to block 303, in which the test case is run normally, and method 300 ends. If it is determined in block 302 that environment modification is enabled based on the global switch 206, flow proceeds from block 302 to block 304. In block 304, the testing environment 201 is modified according to the type of modification specified by the global switch 206. In some embodiments, the environment modification may include testing in a subspace mode, in which only a subset of virtual address space is available to the application under test 202 during the testing. In some embodiments, the environment modification may include implementing a cross-memory environment, in which the application under test 202 starts in one address space and is switched to another during the testing. In some embodiments, the environment modification may include running the application under test 202 in an SRB mode or task mode.

In block 305, asynchronous verification by verification module 207 is started. The asynchronous verification may check for consistency of control blocks 212 in memory 210 related to this test case in some embodiments. For example, the verification module 207 may check that the memory structures of each space are in a valid state. In some embodiments, in which the test case 203 is being run as part of a larger test suite in the testing environment 201, the verification module 207 may already be running, and does not need to be started in block 305.

In block 306, recovery is set up so that the environment modification module 205 may catch errors that occur during the testing that are caused by testing the application under test 202 using test case 203 in the modified environment. Flow then proceeds from block 306 to block 307, in which the application under test 202 is tested using the test case 203 in the modified testing environment 201. The test case 203 is run in block 307 as originally written, but in the modified environment (e.g., in subspace mode, a cross-memory environment, an SRB mode, or task mode). The application under test 202 may call one or more functions, such as functions 204A-N, during the testing of the application under test 202 by the test case 203.

In block 308, it is determined whether an error is encountered during the running of the test case 203 in the modified environment in block 307. If it is determined in block 308 that no error is encountered, flow proceeds from block 308 to block 312, in which it is determined whether the test is complete. If it is determined in block 312 that the test is not complete, flow returns to block 307, and the testing continues to run. Errors continue to be monitored in block 308. If it is determined in block 308 that an error has been encountered, flow proceeds from block 308 to block 309.

In block 309, it is determined by the environment modification module 205 whether the error that was detected in block 308 was caused by the modified environment. If it is determined in block 309 that an error was caused by the modified environment, flow proceeds from block 309 to block 310. In block 310, the error that was caused by the modified environment is suppressed by the environment modification module 205. For example, there are services that are not valid in a cross-memory environment, such as issuing a supervisor call (SVC) instruction. Therefore, if the modified environment comprises a cross-memory environment, an error related to calling a service that is known to be restricted in the cross-memory environment is suppressed in block 310, and the test case 203 may continue running.

If it is determined in block 309 that the error that was detected in block 308 was not caused by the modified environment, flow proceeds from block 309 to block 311. In block 311, the error that was not caused by the modified environment (e.g., an unexpected system error) is percolated normally (e.g., allowed to propagate unsuppressed).

Flow proceeds from both blocks 310 and 311 to block 312, in which it is determined whether the test case 203 is complete. An error that was allowed to percolate in block 311 may cause the test case 203 to be determined to be complete in block 312; however, an error that was suppressed in block 310 allows the test case 203 to continue running (i.e., flow proceeds from block 312 back to block 307). From block 312, blocks 307, 308, and optionally blocks 309, 310, and 311 are repeated until it is determined that the test is complete in block 312. Block 309, and one of blocks 310 and 311, may be performed separately for every error that is detected in block 308 during the running of the test case 203. When it is determined that the test case is complete in block 312, flow proceeds to block 313. In block 313, the verification module 207 may check any memory structures in memory 210 that are related to the testing for errors, such as page tables 211 and control blocks 212, in order to determine whether the testing was successful. Dumps or other unexpected results may also be checked by the verification module 207.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
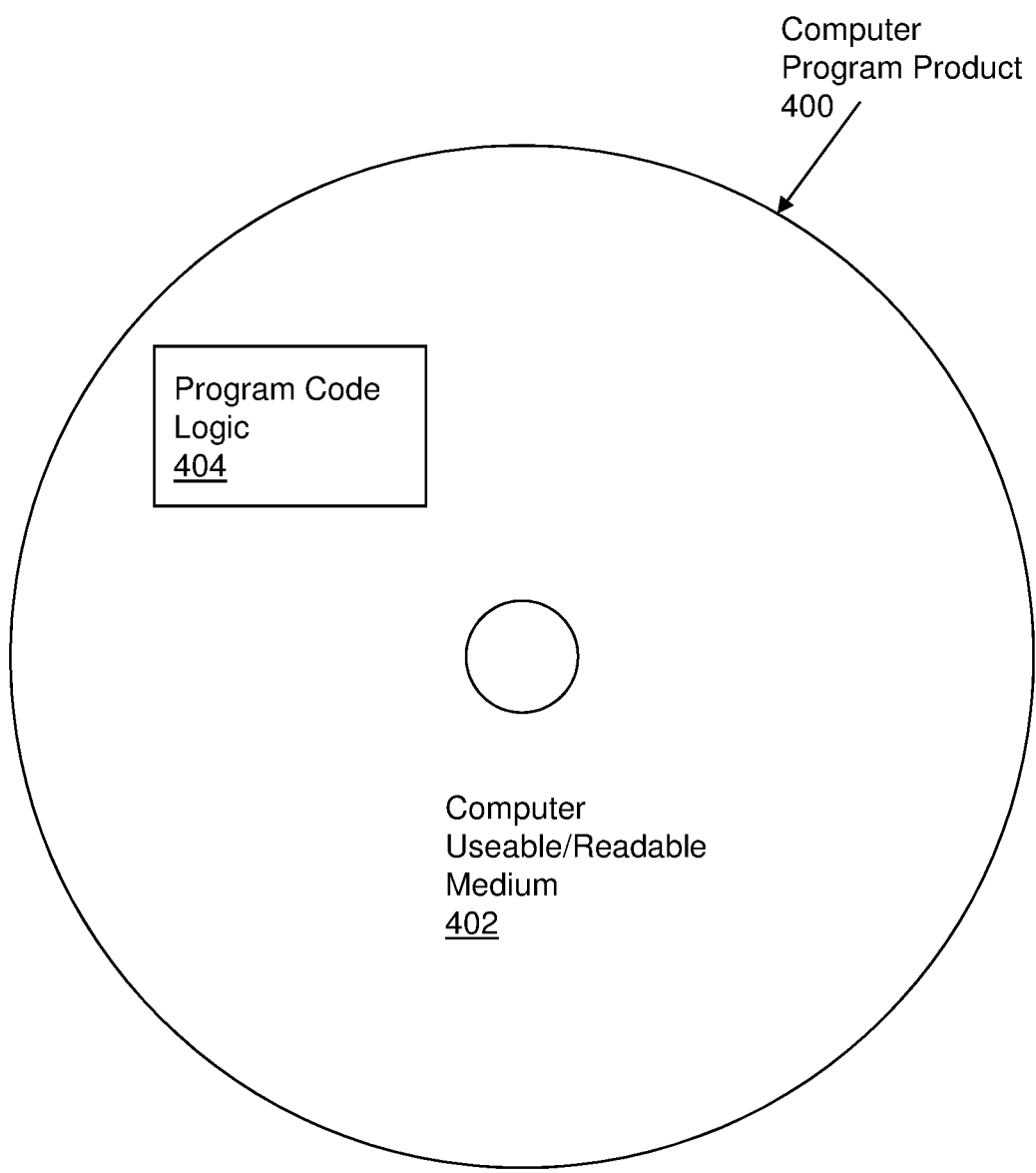
FIG. 4 is an example computer program product that may be used in conjunction with environment modification for software application testing.

Referring now to FIG. 4, a computer program product 400 in accordance with an embodiment that includes a computer-readable storage medium 402 and program instructions 404 is generally shown. Computer program product 400 may be used in conjunction with embodiments of for environment modification for software application testing, as described with respect to FIG. 2 and FIG. 3.

Embodiments can be a system, a method, and/or a computer program product. The computer program product can include a computer-readable storage medium (or media) having computer-readable program instructions thereon for causing a processor to carry out aspects of embodiments of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform embodiments of the present invention.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions. These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks. The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present techniques may be a system, a method or an apparatus. The flowchart and block diagrams in the Figures illustrate the architecture, functionality, and operation of possible implementations of systems, methods, and apparatus according to various embodiments of the present techniques. In this regard, each block in the flowchart or block diagrams may represent a module, segment, or portion of logic for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor configured to execute program instructions to perform a method comprising:
   start testing of an application under test using a test case in a testing environment; and
   based on starting the testing of the application under test using the test case in the testing environment:
      determining whether modification of the testing environment is enabled;
      based on determining that modification of the testing environment is enabled, modifying the testing environment;
      running the testing of the application under test using the test case in the modified testing environment;
      detecting an error during the testing of the application under test using the test case in the modified testing environment;
      based on the detecting of the error during the testing of the application under test using the test case in the modified testing environment:
         determining whether the error was caused by the modified testing environment;
         based on determining that the error was caused by the modified testing environment, suppressing the error and continue the testing of the application under test using the test case in the modified testing environment; and
         based on determining that the error was not caused by the modified testing environment, percolating the error; and
      based on completion of the testing of the application under test using the test case in the modified testing environment, performing verification of the completed testing.

2. The system of claim 1, wherein the modified testing environment comprises a subspace mode.

3. The system of claim 1, wherein the modified testing environment comprises a cross-memory environment.

4. The system of claim 1, wherein the modified testing environment comprises a service request block (SRB) mode.

5. The system of claim 1, wherein determining whether modification of the testing environment is enabled comprises checking a global switch that is set in the testing environment.

6. The system of claim 5, wherein the global switch applies to a test suite that includes the test case.

7. A computer-implemented method, comprising:
   starting, by a processor, testing of an application under test using a test case in a testing environment; and
   based on starting the testing of the application under test using the test case in the testing environment:
      determining whether modification of the testing environment is enabled;
      based on determining that modification of the testing environment is enabled, modifying the testing environment;
      running the testing of the application under test using the test case in the modified testing environment;
      detecting an error during the testing of the application under test using the test case in the modified testing environment;
      based on the detecting of the error during the testing of the application under test using the test case in the modified testing environment:
         determining whether the error was caused by the modified testing environment;

based on determining that the error was caused by the modified testing environment, suppressing the error and continue the testing of the application under test using the test case in the modified testing environment; and based on determining that the error was not caused by the modified testing environment, percolating the error; and based on completion of the testing of the application under test using the test case in the modified testing environment, performing verification of the completed testing.

8. The computer-implemented method of claim 7, wherein the modified testing environment comprises a subspace mode.

9. The computer-implemented method of claim 7, wherein the modified testing environment comprises a cross-memory environment.

10. The computer-implemented method of claim 7, wherein the modified testing environment comprises a service request block (SRB) mode.

11. The computer-implemented method of claim 7, wherein determining whether modification of the testing environment is enabled comprises checking a global switch that is set in the testing environment.

12. The computer-implemented method of claim 11, wherein the global switch applies to a test suite that includes the test case.

13. A computer program product comprising:

a non-transitory computer readable storage medium having program instructions embodied therewith, the program instructions executable by a processing device to cause the processing device to perform a method comprising:

starting testing of an application under test using a test case in a testing environment; and based on starting the testing of the application under test using the test case in the testing environment:

determining whether modification of the testing environment is enabled;

based on determining that modification of the testing environment is enabled, modifying the testing environment;

running the testing of the application under test using the test case in the modified testing environment;

detecting an error during the testing of the application under test using the test case in the modified testing environment;

based on the detecting of the error during the testing of the application under test using the test case in the modified testing environment:

determining whether the error was caused by the modified testing environment;

based on determining that the error was caused by the modified testing environment, suppressing the error and continue the testing of the application under test using the test case in the modified testing environment; and based on determining that the error was not caused by the modified testing environment, percolating the error; and based on completion of the testing of the application under test using the test case in the modified testing environment, performing verification of the completed testing.

14. The computer program product of claim 13, wherein the modified testing environment comprises a subspace mode.

15. The computer program product of claim 13, wherein the modified testing environment comprises a cross-memory environment.

16. The computer program product of claim 13, wherein the modified testing environment comprises a service request block (SRB) mode.

17. The computer program product of claim 13, wherein determining whether modification of the testing environment is enabled comprises checking a global switch that is set in the testing environment.

* * * * *